US012663806B2

(12) United States Patent
Kojima

(10) Patent No.: US 12,663,806 B2
(45) Date of Patent: Jun. 23, 2026

(54) AUTOMATIC TAKEOFF/LANDING SYSTEM FOR VERTICAL TAKEOFF/LANDING AIRCRAFT, VERTICAL TAKEOFF/LANDING AIRCRAFT, AND CONTROL METHOD FOR TAKEOFF/LANDING OF VERTICAL TAKEOFF/LANDING AIRCRAFT

(71) Applicant: MITSUBISHI HEAVY INDUSTRIES, LTD., Tokyo (JP)

(72) Inventor: Toru Kojima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 36 days.

(21) Appl. No.: 18/724,492

(22) PCT Filed: Oct. 31, 2022

(86) PCT No.: PCT/JP2022/040661
§ 371 (c)(1),
(2) Date: Jun. 26, 2024

(87) PCT Pub. No.: WO2023/127289
PCT Pub. Date: Jul. 6, 2023

(65) Prior Publication Data
US 2025/0068179 A1    Feb. 27, 2025

(30) Foreign Application Priority Data
Dec. 27, 2021    (JP) .................................. 2021-213299

(51) Int. Cl.
*G05D 1/606* (2024.01)
*G05D 1/652* (2024.01)
(Continued)

(52) U.S. Cl.
CPC .............. *G05D 1/606* (2024.01); *G05D 1/652* (2024.01); *G05D 1/6542* (2024.01); *G05D 2109/23* (2024.01)

(58) Field of Classification Search
CPC ...... G05D 1/606; G05D 1/652; G05D 1/6542; G05D 2109/23
See application file for complete search history.

(56) References Cited

U.S. PATENT DOCUMENTS 4,648,749 A    3/1987   Ferguson
11,560,217 B2    1/2023   Adachi et al.
(Continued)

FOREIGN PATENT DOCUMENTS

JP    2020-45049    3/2020
JP    2021-62719    4/2021

OTHER PUBLICATIONS

Fang, R. et al., "Helicopter—ship qualification testing", National Aerospace Laboratory NRL, May 2006, Nationaal Lucht-en Rulmtevaartlaboratorium, 51 pages.
(Continued)

*Primary Examiner* — Hitesh Patel
*Assistant Examiner* — Joshua Jeffrey Penko
(74) *Attorney, Agent, or Firm* — Wenderoth, Lind & Ponack, L.L.P.

(57) ABSTRACT

This automatic takeoff/landing system for a vertical takeoff/landing aircraft comprises: a relative wind information acquisition unit that acquires the direction of relative wind at a moving object; and a control unit that executes takeoff/landing control to cause the vertical takeoff/landing aircraft to takeoff/land at a landing target point provided on the moving object. The control unit, during takeoff/landing of the vertical takeoff/landing aircraft, executes the takeoff/landing control on the basis of the direction of the relative
(Continued)

wind acquired by the relative wind information acquisition unit, in a state in which the aircraft heading of the vertical takeoff/landing aircraft is caused to face the direction of the relative wind.

11 Claims, 7 Drawing Sheets

(51) Int. Cl.
  *G05D 1/654* (2024.01)
  *G05D 109/22* (2024.01)

(56) References Cited

U.S. PATENT DOCUMENTS

| | | | | |
|---|---|---|---|---|
| 2008/0283661 A1* | 11/2008 | Henley | ..................... | B64F 1/10 |
| | | | | 244/114 R |
| 2011/0202209 A1* | 8/2011 | Moresve | .............. | G05D 1/0684 |
| | | | | 701/15 |
| 2020/0233439 A1* | 7/2020 | Ivanov | ..................... | G08G 5/26 |
| 2023/0027342 A1 | 1/2023 | Kojima et al. | | |

OTHER PUBLICATIONS

Notice of Reasons for Refusal issued Mar. 5, 2024 in Japanese Application No. 2021-213299 (with English translation).
Extended Search Report issued Dec. 23, 2024 in corresponding European Patent Application No. 22915522.1.

\* cited by examiner

START

RETURNING MODE ⌐S1

APPROACH MODE AND
HIGH-ALTITUDE HOVERING MODE ⌐S2

LOW-ALTITUDE HOVERING MODE ⌐S3

LANDING MODE ⌐S4

END

FIG. 6

| RELATIVE WIND | FRONT (0 deg) | RIGHT 30 deg | RIGHT 60 deg | RIGHT 90 deg | RIGHT 120 deg | RIGHT 150 deg | REAR (180 deg) |
|---|---|---|---|---|---|---|---|
| SHIP HEADING | SHIP HEADING | SHIP HEADING +30 deg | SHIP HEADING +60 deg | SHIP HEADING +90 deg | SHIP HEADING +120 deg | SHIP HEADING +150 deg | SHIP HEADING +180 deg |
| APPROACHING METHOD | | | | | | | |

FIG. 9

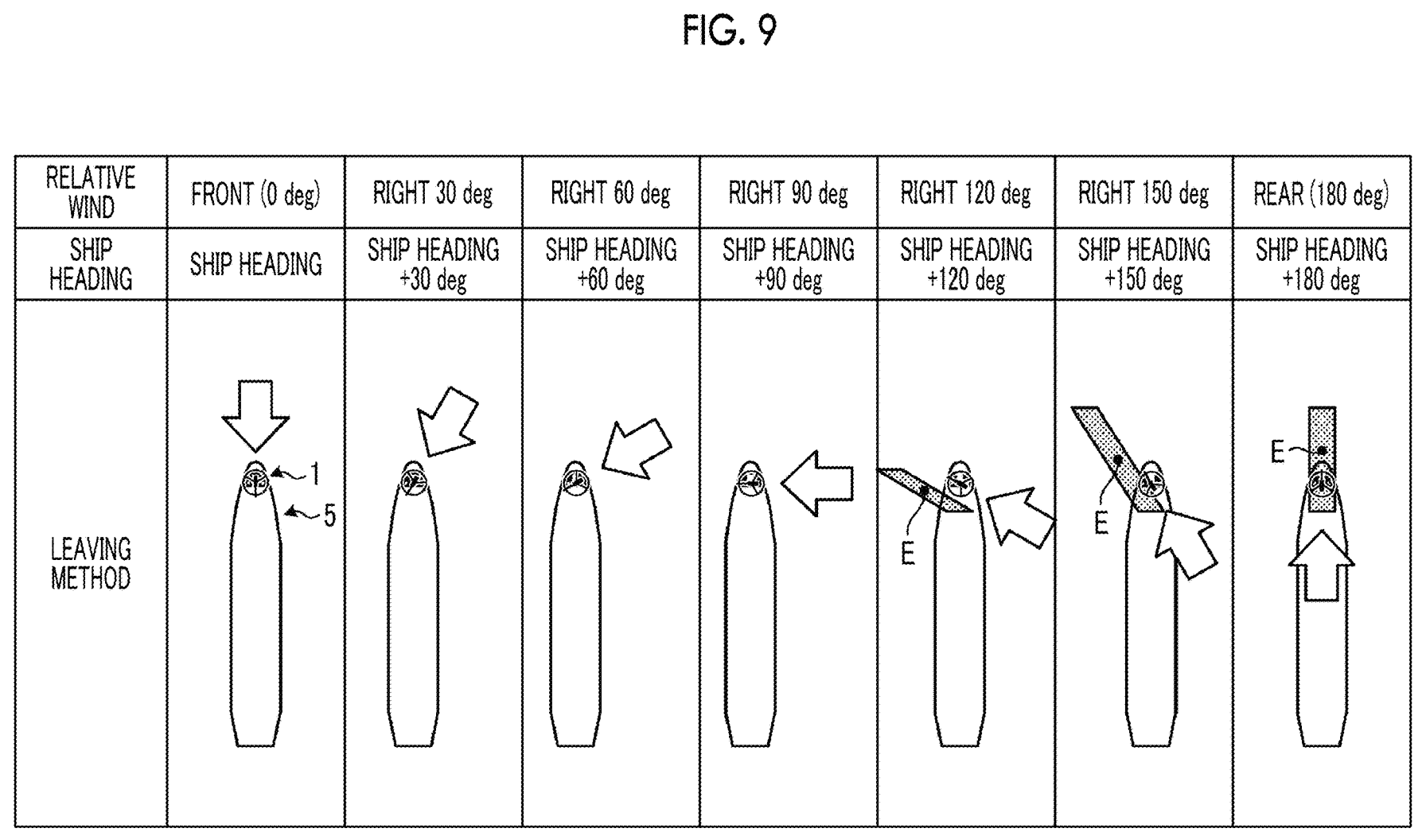

| RELATIVE WIND | FRONT (0 deg) | RIGHT 30 deg | RIGHT 60 deg | RIGHT 90 deg | RIGHT 120 deg | RIGHT 150 deg | REAR (180 deg) |
|---|---|---|---|---|---|---|---|
| SHIP HEADING | SHIP HEADING | SHIP HEADING +30 deg | SHIP HEADING +60 deg | SHIP HEADING +90 deg | SHIP HEADING +120 deg | SHIP HEADING +150 deg | SHIP HEADING +180 deg |
| LEAVING METHOD | | | | | | | |

AUTOMATIC TAKEOFF/LANDING SYSTEM FOR VERTICAL TAKEOFF/LANDING AIRCRAFT, VERTICAL TAKEOFF/LANDING AIRCRAFT, AND CONTROL METHOD FOR TAKEOFF/LANDING OF VERTICAL TAKEOFF/LANDING AIRCRAFT

TECHNICAL FIELD

The present disclosure relates to an automatic takeoff/landing system for a vertical takeoff/landing aircraft, a vertical takeoff/landing aircraft, and a control method for takeoff/landing of a vertical takeoff/landing aircraft.

BACKGROUND ART

In the related art, an aircraft landing assistance device that assists an aircraft in landing at a predetermined landing point is known (for example, refer to PTL 1). The landing assistance device estimates a wind direction and a wind speed of the landing point with high accuracy, based on a shape of a surrounding of the landing point and a wind direction and a wind speed above the landing point.

CITATION LIST

Patent Literature

[PTL 1] Japanese Unexamined Patent Application Publication No. 2020-045049

SUMMARY OF INVENTION

Technical Problem

In a case where an aircraft such as a vertical takeoff/landing aircraft takes off and lands at a landing point on a moving object such as a ship, a aircraft heading of the vertical takeoff/landing aircraft and a ship heading of the ship coincide with each other, and the takeoff/landing to the landing point of the vertical takeoff/landing aircraft is performed. At this time, the vertical takeoff/landing aircraft performs takeoff/landing to the landing point, in consideration of the influence of a relative wind which is a wind relative to the vertical takeoff/landing aircraft. In the case of a ship and a vertical takeoff/landing aircraft, a takeoff/landing restriction due to a relative wind is set so that a safe takeoff/landing can be performed. The takeoff/landing restriction due to the relative wind is a range of a wind direction (direction) and a wind strength (wind speed) of the relative wind in which safe takeoff/landing is possible, and the takeoff/landing to the landing point of the vertical takeoff/landing aircraft is performed within this range.

However, in a case of being outside the range of the takeoff/landing restriction due to the relative wind, it is necessary to temporarily change the aircraft heading of the vertical takeoff/landing aircraft and the ship heading of the ship to be within the range of the takeoff/landing restriction when navigation is being performed. Changing the ship heading of the ship means changing the course of the ship, which affects the navigation of the ship.

An object of the present disclosure is to provide an automatic takeoff/landing system for a vertical takeoff/landing aircraft, a vertical takeoff/landing aircraft, and a control method for takeoff/landing of a vertical takeoff/landing aircraft, which can relax the takeoff/landing restriction due to the relative wind and can suitably perform takeoff/landing at a landing target point.

Solution to Problem

According to the present disclosure, there is provided an automatic takeoff/landing system for a vertical takeoff/landing aircraft including: a relative wind information acquisition unit that acquires a direction of a relative wind surrounding a moving object; and a control unit that executes takeoff/landing control for takeoff/landing of the vertical takeoff/landing aircraft at a landing target point provided on the moving object, in which the control unit, during takeoff/landing of the vertical takeoff/landing aircraft, executes the takeoff/landing control based on the direction of the relative wind acquired by the relative wind information acquisition unit, in a state in which an aircraft heading of the vertical takeoff/landing aircraft faces the direction of the relative wind.

A vertical takeoff/landing aircraft of the present disclosure includes the above-described automatic takeoff/landing system for a vertical takeoff/landing aircraft.

According to the present disclosure, there is provided a control method for takeoff/landing of a vertical takeoff/landing aircraft causing an automatic takeoff/landing system of the vertical takeoff/landing aircraft, which executes takeoff/landing control for takeoff/landing of the vertical takeoff/landing aircraft at a landing target point provided on a moving object, to execute: a step of acquiring a direction of a relative wind in the moving object; a step of causing an aircraft heading of the vertical takeoff/landing aircraft to face the direction of the relative wind based on the acquired direction of the relative wind; and a step of causing the vertical takeoff/landing aircraft to takeoff/land at the landing target point.

Advantageous Effects of Invention

According to the present disclosure, it is possible to relax the restriction due to the relative wind and suitably perform landing at the landing target point.

BRIEF DESCRIPTION OF DRAWINGS

FIG. 6 is an explanatory view showing an example of a pattern of the takeoff/landing control during the landing of the vertical takeoff/landing aircraft according to the present embodiment.

FIG. 9 is an explanatory view showing an example of a pattern of the takeoff/landing control when the vertical takeoff/landing aircraft takes off according to the present embodiment.

DESCRIPTION OF EMBODIMENTS

Hereinafter, embodiments according to the present disclosure will be described in detail with reference to the drawings. Note that the present disclosure is not limited to this embodiment. In addition, components in the embodiments described below include those that can be easily replaced by those skilled in the art, or those that are substantially the same. Furthermore, the components described below can be combined as appropriate, and in a case where there are a plurality of embodiments, the embodiments can be combined.

EMBODIMENT

Figures 1, 2:
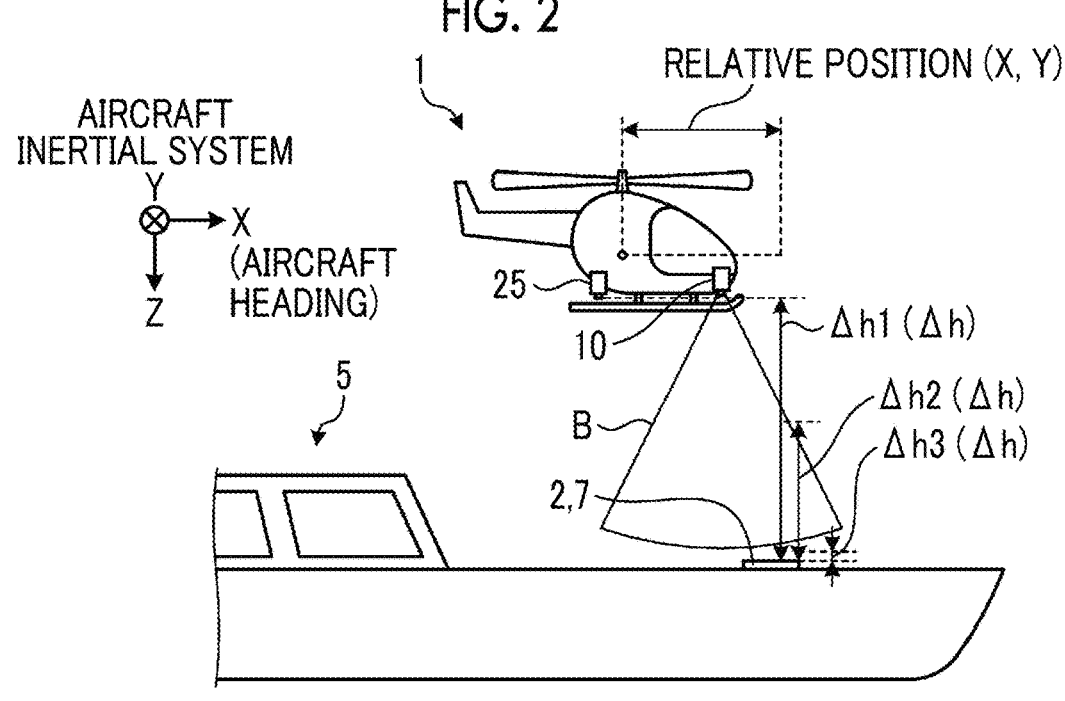
FIG. 1 is a schematic configuration diagram showing an example of an automatic takeoff/landing system for a vertical takeoff/landing aircraft according to the present embodiment.
FIG. 2 is an explanatory view showing a state in which the vertical takeoff/landing aircraft according to the present embodiment is heading to a landing target point.

FIG. 1 is a schematic configuration diagram showing an example of an automatic takeoff/landing system for a vertical takeoff/landing aircraft according to the present embodiment, and FIG. 2 is an explanatory view showing a state in which the vertical takeoff/landing aircraft according to the present embodiment is heading to a landing target point. The vertical takeoff/landing aircraft 1 according to the present embodiment is a flying object (for example, a helicopter, a drone, or the like) as a rotary-wing aircraft. In the present embodiment, the vertical takeoff/landing aircraft 1 is an unmanned aircraft and has an airframe having a directionality including a head and a tail. Specifically, the vertical takeoff/landing aircraft 1 is an unmanned helicopter. The vertical takeoff/landing aircraft 1 may be any flying object capable of moving forward, backward, sideways, turning, and hovering, and may be a manned aircraft. In addition, in a case where the vertical takeoff/landing aircraft 1 is an unmanned aircraft, when the remote manual piloting is executed during the flight control of the unmanned aircraft by the autopilot, flight control based on the remote manual piloting is prioritized. Similarly, in a case where the vertical takeoff/landing aircraft 1 is a manned aircraft, when manual piloting is executed during flight control of the manned aircraft by the autopilot, flight control based on the manual piloting is prioritized. The vertical takeoff/landing aircraft 1 is mounted with an automatic takeoff/landing system 100, and flight is controlled by the automatic takeoff/landing system 100 to land at a landing target point 2 shown in FIG. 2.

(Landing Target Point)

In the present embodiment, as shown in FIG. 2, the landing target point 2 is provided on the bow side of a ship 5. The vertical takeoff/landing aircraft 1 lands (touches down) on the ship 5 as a moving object moving on water. The landing target point 2 is not limited to the bow side of the ship 5, and may be provided on the stern side of the ship 5. In addition, the landing target point 2 may be provided in a vehicle or the like as a moving object moving on the ground. Further, in the present embodiment, the ship 5 is a manned ship, but may be an unmanned ship. The landing target point 2 is provided with a marker 7 for the vertical takeoff/landing aircraft 1 to capture the position of the landing target point 2. The marker 7 is a marker whose position of the landing target point 2 can be captured by image processing.

(Ship)

As shown in FIG. 1, the ship 5 includes a navigation system 70, a data transmission device 80, an operation display unit 90, and a wind direction and speed meter (relative wind information acquisition unit) 95. The navigation system 70 is, for example, an inertial navigation system (INS), and acquires an attitude angle in a pitch direction and a roll direction, a ship heading, a speed, an acceleration, a position coordinate in an earth coordinate system, and the like of the ship 5. In the present embodiment, the navigation system 70 is described as being applied to the inertial navigation system, but is not particularly limited, and any navigation system 70 may be used. In addition, in the present embodiment, the navigation system 70 is an inertial navigation system including a global positioning system (GPS) as a position measurement unit in order to improve the measurement accuracy of the position. In the present embodiment, the inertial navigation system including the GPS is applied and described. However, the present disclosure is not particularly limited to the GPS, and any position measurement unit capable of accurately measuring a position may be used. For example, a quasi-zenith satellite system may be used, and a configuration in which the position measurement unit such as the GPS is omitted may be used as long as the position can be accurately measured only by the navigation system 70. In addition, the navigation system 70 may acquire at least a part of various types of data by a sensor. The data transmission device 80 is included in an automatic takeoff/landing system 100 (to be described later) and exchanges various signals with the data transmission device 40 mounted on the vertical takeoff/landing aircraft 1 through wireless communication. The operation display unit 90 is a user interface through which an operator who is a crew member of the ship 5 grasps a control status and inputs various instructions. As the instruction input by the operator through the operation display unit 90, for example, a transition instruction of a control mode to be described later is included. The details of the transition instruction will be described later. The instruction input in the operation display unit 90 is transmitted from the data transmission device 80 to the data transmission device 40. In addition, the control status of the vertical takeoff/landing aircraft 1 is transmitted from the data transmission device 40 to the data transmission device 80. That is, the data transmission device 40 and the data transmission device 80 can perform bidirectional communication. The wind direction and speed meter 95 is included in the automatic takeoff/landing system 100 (to be described later) as in the data transmission device 80, and measures and acquires the wind direction and speed of the relative wind in the ship 5. The relative wind is a relative wind flow between the ship 5 and the air. The wind direction and speed meter 95 transmits the measured wind direction and speed of the relative wind to the data transmission device 40 from the data transmission device 80.

(Automatic Takeoff/Landing System)

The automatic takeoff/landing system 100 for the vertical takeoff/landing aircraft 1 according to the present embodiment is a system that controls the position of the vertical takeoff/landing aircraft 1 in order to land the vertical takeoff/landing aircraft 1 in flight at the landing target point 2. The automatic takeoff/landing system 100 is mounted on the vertical takeoff/landing aircraft 1 and the ship 5. As shown in FIG. 1, the automatic takeoff/landing system 100 includes a camera 10, a navigation system 20, a control unit 30, and a data transmission device 40. In the present embodiment, the control unit 30 of the automatic takeoff/landing system 100 uses the control unit mounted in the vertical takeoff/landing aircraft 1. However, the control unit mounted in the ship 5 may be used, or the control unit of the vertical takeoff/landing aircraft 1 and the control unit of the ship 5 may be used in cooperation with each other.

The camera 10 is mounted on the vertical takeoff/landing aircraft 1 via a gimbal (not shown). The camera 10 may be a monocular camera, a binocular camera, an infrared camera, or the like, as long as the camera 10 can capture the marker 7. The camera 10 is provided to capture the marker 7 provided at the landing target point 2 from the vertical takeoff/landing aircraft 1. The camera 10 can adjust an imaging direction via a gimbal (not shown). In the present embodiment, the control unit 30 controls the camera 10 such that an imaging range (angle of view) B (refer to FIG. 2) of the camera 10 faces directly below in the vertical direction as an example. The camera 10 may be controlled by the control unit 30 such that the imaging range B faces an oblique front side with respect to the vertical direction. In addition, the camera 10 may omit the gimbal, and may be fixed directly below the airframe of the vertical takeoff/landing aircraft 1 such that the imaging direction faces, for example, a lower side in the vertical direction.

The navigation system 20 is an inertial navigation system including, for example, a GPS, as in the navigation system 70. The navigation system 20 may be an inertial navigation system including a position measurement unit such as GPS, as in the navigation system 70, or may be an inertial navigation system excluding a position measurement unit such as GPS, and is not particularly limited. The navigation) including the GPS acquires the attitude angle in the pitch direction and the roll direction, the aircraft heading, the airframe speed, the airframe acceleration, and the position coordinate in the earth coordinate system of the vertical takeoff/landing aircraft 1. The navigation system 20 may have an attitude angle sensor that detects an attitude angle of the vertical takeoff/landing aircraft 1, a speed detection sensor that detects an airframe speed of the vertical takeoff/landing aircraft 1, an acceleration detection sensor that detects an airframe acceleration of the vertical takeoff/landing aircraft 1, and a sensor that detects an aircraft heading of the vertical takeoff/landing aircraft 1. The navigation system 20 outputs the acquired attitude angle, the airframe speed, the airframe acceleration, and the position coordinate of the vertical takeoff/landing aircraft 1 to the control unit 30.

In addition, as shown in FIG. 1, the automatic takeoff/landing system 100 includes an altitude sensor 25 that detects an altitude of the vertical takeoff/landing aircraft 1 from the ground surface or the water surface. The altitude sensor 25 is, for example, a laser altimeter, and measures a relative altitude Δh (refer to FIG. 2) from the vertical takeoff/landing aircraft 1 to the landing target point 2. As the altitude sensor 25, a radio altimeter may be used, a barometric altimeter may be used, or any altimeter may be used. In addition, the altimeters may be appropriately combined and applied to measure an altitude from a ground surface or an altitude from a sea surface according to a use environment. The altitude sensor 25 outputs the detected relative altitude Δh of the vertical takeoff/landing aircraft 1 to the control unit 30. The altitude sensor 25 measures the altitude of the vertical takeoff/landing aircraft 1 and outputs the altitude to the control unit 30, and the control unit 30 may calculate the relative altitude Δh (see FIG. 2) to the landing target point 2 based on the altitude of the vertical takeoff/landing aircraft 1 in the guidance calculation unit 34 (to be described later). In addition, the automatic takeoff/landing system 100 may not be limited to the altitude sensor 25, and may calculate the relative altitude Δh between the vertical takeoff/landing aircraft 1 and the ship 5 by performing image processing on an image including the marker 7 captured by the camera 10 in an image processing unit 32 which will be described later.

(Control Unit)

The control unit 30 includes an image processing unit 32, a guidance calculation unit 34, and a flight control unit 36. The control unit 30 includes a imaging control unit (not shown) that controls the imaging direction of the camera 10 via a gimbal (not shown) provided in the vertical takeoff/landing aircraft 1. In the present embodiment, as described above, the imaging range B of the camera 10 is adjusted to face the directly below in the vertical direction.

The image processing unit 32 performs image processing on the image captured by the camera 10 to calculate the center of the marker 7, that is, the landing target point 2. The center here is a coordinate point in a camera fixed coordinate system with the center of the image captured by the camera 10 as an origin, and can be calculated by the number of pixels from the center of the image. The landing target point 2 is not limited to the center of the marker 7, and may be any of the four corners of the marker 7 or may be a position offset from the center of the marker 7.

In addition, as described above, the image processing unit 32 may calculate the relative altitude Δh between the vertical takeoff/landing aircraft 1 and the ship 5 by performing image processing on the image including the marker 7 captured by the camera 10. Further, the image processing unit 32 may specify a direction of the marker 7 by performing image processing on the image including the marker 7 captured by the camera 10, and may calculate the ship heading of the ship 5 by associating the direction of the marker 7 with the aircraft heading of the vertical takeoff/landing aircraft 1 acquired by the navigation system 20. A marker for calculating the ship heading may be separately provided in the ship 5.

The guidance calculation unit 34 calculates a control amount of the vertical takeoff/landing aircraft 1 for guiding the vertical takeoff/landing aircraft 1 to the landing target point 2. The control amount is a control amount for adjusting the airframe speed, the attitude angle, a change rate of the attitude angle, and the like of the vertical takeoff/landing aircraft 1. The guidance calculation unit 34 calculates a relative position (X, Y) between the vertical takeoff/landing aircraft 1 and the landing target point 2 and a relative speed between the vertical takeoff/landing aircraft 1 and the landing target point 2 in order to calculate the control amount.

The guidance calculation unit 34 calculates the relative position (X, Y) between the vertical takeoff/landing aircraft 1 and the landing target point 2 based on the center of the marker 7 calculated by the image processing unit 32, the direction of the camera 10, that is, the aircraft heading of the vertical takeoff/landing aircraft 1, and the altitude of the vertical takeoff/landing aircraft 1 (the relative altitude Δh with respect to the landing target point 2). In the present embodiment, the direction of the camera 10 is made to coincide with the aircraft heading of the vertical takeoff/landing aircraft 1. However, the present disclosure is not particularly limited thereto, and the direction of the camera 10 may not coincide with the aircraft heading of the vertical takeoff/landing aircraft 1. The relative position (X, Y) is a distance between the vertical takeoff/landing aircraft 1 and the landing target point 2 in the horizontal direction. More specifically, the guidance calculation unit 34 converts the center of the marker 7 in the camera fixed coordinate system calculated by the image processing unit 32 into the relative position between the vertical takeoff/landing aircraft 1 and the landing target point 2 in a ship inertial system, based on the aircraft heading of the vertical takeoff/landing aircraft 1 and the altitude of the vertical takeoff/landing aircraft 1 (relative altitude Δh with respect to the landing target point 2), and further converts the center of the marker 7 into the relative position (X, Y) between the vertical takeoff/landing aircraft 1 and the landing target point 2 in an aircraft inertial system. At this time, the guidance calculation unit 34 may directly convert the center of the marker 7 into the relative position (X, Y) between the vertical takeoff/landing aircraft 1 and the landing target point 2 in the aircraft inertial system based on the aircraft of the vertical heading takeoff/landing aircraft 1 and the altitude of the vertical takeoff/landing aircraft 1 (relative altitude Δh with respect to the landing target point 2). The ship inertial system is a coordinate system in which the landing target point 2 is an origin, and a direction along the ship heading of the ship 5, a direction orthogonal to the ship heading of the ship 5 in the horizontal direction, and a vertical direction are orthogonal axes. In addition, as shown in FIG. 2, the aircraft inertial system is a coordinate system in which the vertical takeoff/landing aircraft 1 is an origin, a direction along the aircraft heading of the vertical takeoff/landing aircraft 1 is an X axis, a direction orthogonal to the aircraft heading of the vertical takeoff/landing aircraft 1 in a horizontal direction is a Y axis, and a vertical direction is a Z axis.

In addition, the guidance calculation unit 34 calculates the relative speed between the vertical takeoff/landing aircraft 1 and the landing target point 2. More specifically, the guidance calculation unit 34 calculates the relative speed, for example, based on a difference between the airframe speed of the vertical takeoff/landing aircraft 1 acquired by the navigation systems 20 and 70 and the hull speed of the ship 5. In addition, the guidance calculation unit 34 may calculate the relative speed based on the pseudo-differentiation of the relative position (X, Y). In addition, the guidance calculation unit 34 calculates the relative heading between the aircraft heading of the vertical takeoff/landing aircraft 1 and the ship heading of the ship 5.

In addition, the guidance calculation unit 34 calculates the relative altitude Δh to the landing target point 2, based on the altitude of the vertical takeoff/landing aircraft 1 detected by the altitude sensor 25. In the image processing unit 32, the relative altitude Δh between the vertical takeoff/landing aircraft 1 and the ship 5 may be calculated by performing image processing on the image including the marker 7 captured by the camera 10.

Then, the guidance calculation unit 34 calculates a control amount by feedback control (for example, PID control) based on the relative position (X, Y), the relative speed, the relative heading, and the airframe acceleration. In the present embodiment, the guidance calculation unit 34 calculates the control amount of the vertical takeoff/landing aircraft 1 by feedback control such that the relative position (X, Y) becomes zero. In addition, the guidance calculation unit 34 calculates the control amount of the vertical takeoff/landing aircraft 1 by feedback control such that the relative heading becomes a predetermined direction. The predetermined direction is a range that satisfies a state in which the vertical takeoff/landing aircraft 1 can stably fly even when affected by the relative wind. Further, the guidance calculation unit 34 calculates the control amount of the vertical takeoff/landing aircraft 1 by feedback control such that the relative speed is within a predetermined speed and such that the airframe acceleration is within a predetermined acceleration. The predetermined speed and the predetermined acceleration are within a range that satisfies in which the vertical takeoff/landing aircraft 1 is in a state in which stable flight is possible at a predetermined relative altitude Δh. For example, the predetermined speed is zero, and the predetermined acceleration is zero. The guidance calculation unit 34 outputs the calculated control amount to the flight control unit 36. In calculating such a control amount, the guidance calculation unit 34 controls the vertical takeoff/landing aircraft 1 in a plurality of control modes to guide the vertical takeoff/landing aircraft 1 to the landing target point 2 and land the vertical takeoff/landing aircraft 1. The plurality of control modes include an approach mode, a hovering mode including a high-altitude hovering mode and a low-altitude hovering mode, and a landing mode. Details of each control mode will be described later.

The flight control unit 36 controls each component of the vertical takeoff/landing aircraft 1 to fly the vertical takeoff/landing aircraft 1 in accordance with a control amount calculated by the guidance calculation unit 34 which will be described later. The flight control unit 36 controls a blade pitch angle, the rotation speed, and the like of each rotor blade according to the control amount, and adjusts the airframe speed, the attitude angle, the change rate of the attitude angle, and the like of the vertical takeoff/landing aircraft 1. Accordingly, the vertical takeoff/landing aircraft 1 is guided to the landing target point 2. In the present embodiment, the image processing unit 32 and the guidance calculation unit 34 are described as separate functional units from the flight control unit 36. However, the flight control unit 36, the image processing unit 32, and the guidance calculation unit 34 may be integrated into one functional unit. That is, the flight control unit 36 may perform the processing of the image processing unit 32 and the guidance calculation unit 34.

(Control Method for Takeoff/Landing of Vertical Takeoff/Landing Aircraft)

Figure 3:
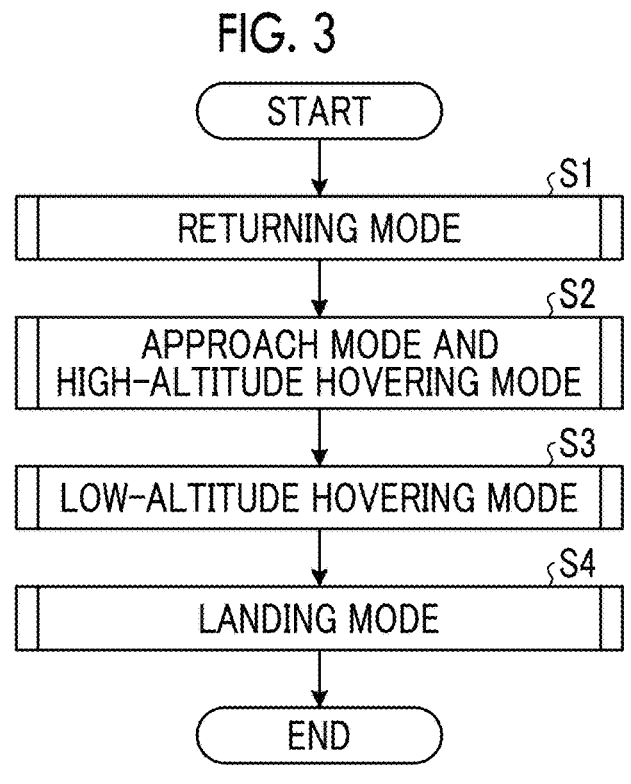
FIG. 3 is a flowchart showing an example of a processing procedure of a control method for takeoff/landing during landing of the vertical takeoff/landing aircraft according to the present embodiment.
Figure 4:
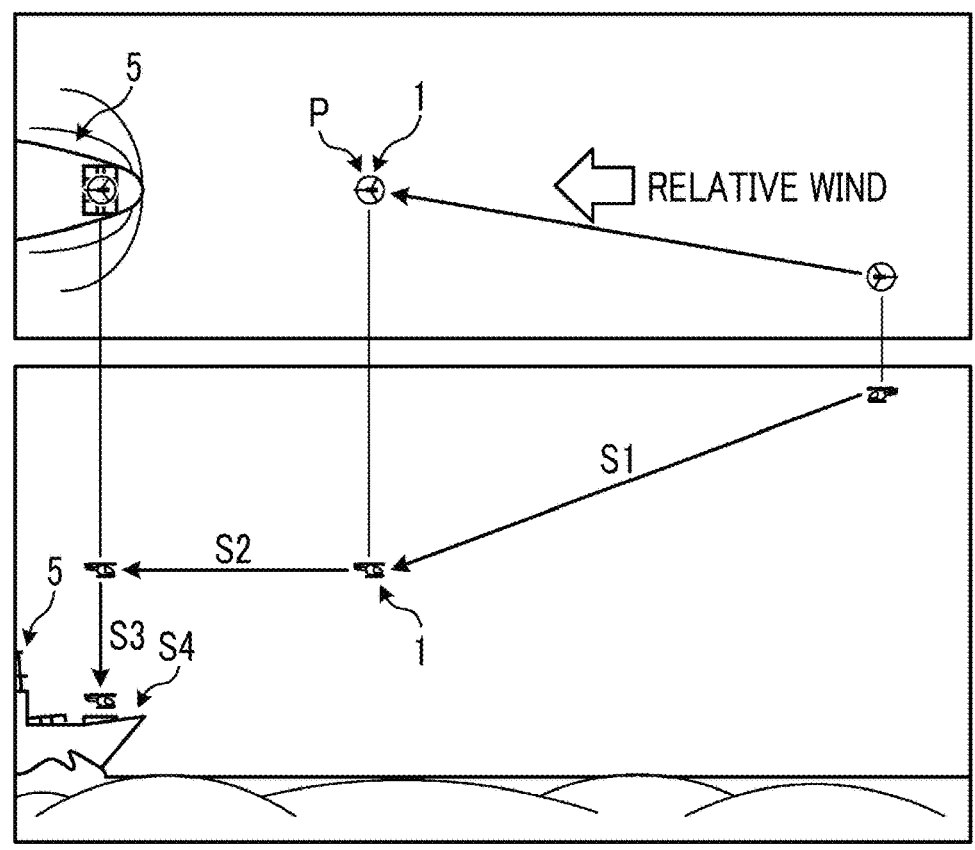
FIG. 4 is an explanatory view showing a landing operation of the vertical takeoff/landing aircraft according to the present embodiment.
Figure 5:
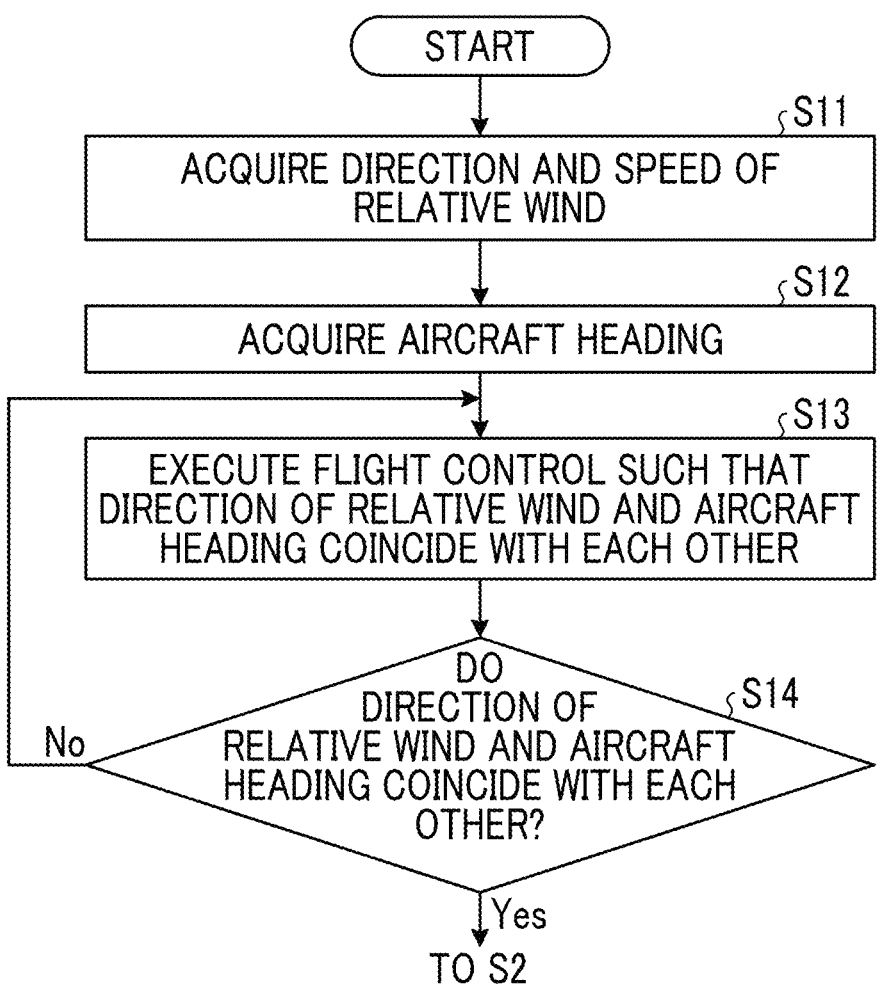
FIG. 5 is a flowchart showing an example of a processing procedure of the control method for takeoff/landing during the landing of the vertical takeoff/landing aircraft according to the present embodiment.

Next, a procedure for guiding the vertical takeoff/landing aircraft 1 to the landing target point 2 and landing the vertical takeoff/landing aircraft 1 at the landing target point 2 by the control unit 30 will be described as a control method for takeoff/landing of the vertical takeoff/landing aircraft according to the present embodiment. FIG. 3 is a flowchart showing an example of a processing procedure of the control method for takeoff/landing during landing of the vertical takeoff/landing aircraft according to the present embodiment. FIG. 4 is an explanatory view showing a landing operation of the vertical takeoff/landing aircraft according to the present embodiment. FIG. 5 is a flowchart showing an example of a processing procedure of the control method for takeoff/landing during the landing of the vertical takeoff/landing aircraft according to the present embodiment. FIG. 6 is an explanatory view showing an example of a pattern of the takeoff/landing control during the landing of the vertical takeoff/landing aircraft according to the present embodiment.

First, the landing operation of the vertical takeoff/landing aircraft 1 will be described with reference to FIGS. 3 and 4. The vertical takeoff/landing aircraft 1 executes a plurality of control modes in a series of landing operations of landing (touching down) on the ship 5 from a flight state. Specifically, the vertical takeoff/landing aircraft 1 performs a series of landing operations by sequentially performing step S1 of executing a returning mode, step S2 of executing the approach mode and the high-altitude hovering mode, step S3 of executing the low-altitude hovering mode, and step S4 of executing the landing mode.

As shown in FIG. 4, the returning mode is a mode in which the vertical takeoff/landing aircraft 1 is moved toward the ship 5 and is moved to a return position P (refer to FIG. 6) in the vicinity of the ship 5 by a command from the ship 5 (S1). The approach mode is a mode in which the vertical takeoff/landing aircraft 1 approaches a deck of the ship 5 from the return position P (S2). The return position P is at any position, for example, be a position where may the vertical takeoff/landing aircraft approaches from a side of the ship 5 (ship width direction). The high-altitude hovering mode is a mode that is transitioned to when the vertical takeoff/landing aircraft 1 captures the marker 7 on the deck with the camera 10 during the execution of the approach mode, and is a mode in which the vertical takeoff/landing aircraft 1 hovers such that the landing target point 2 comes to the center of the imaging range (angle of view) B of the camera 10 (S2). The low-altitude hovering mode is a mode in which the vertical takeoff/landing aircraft 1 descends and hovers at an altitude lower than that in the high-altitude hovering mode (S3). The landing mode is a mode in which the vertical takeoff/landing aircraft 1 lands at the landing target point 2 (S4).

In a series of controls related to such a landing operation, the automatic takeoff/landing system 100 executes the takeoff/landing control shown in FIG. 5. The takeoff/landing control shown in FIG. 5 is control for causing the aircraft heading of the vertical takeoff/landing aircraft 1 to face the direction of the relative wind during the landing operation. The takeoff/landing control shown in FIG. 5 is executed during the execution of the returning mode or after the completion of the returning mode, and at a timing immediately before the transition to the approach mode. The takeoff/landing control shown in FIG. 5 is not particularly limited to the above timing, and may be performed at any timing as long as it is before landing on the landing target point 2.

In the automatic takeoff/landing system 100, in the ship 5, the wind direction and speed of the relative wind are measured and acquired by the wind direction and speed meter 95, and the control unit 30 of the vertical takeoff/landing aircraft 1 acquires the wind direction and speed of the relative wind acquired by the ship 5 (step S11). In step S11, the control unit 30 acquires the direction of the relative wind measured by the wind direction and speed meter 95. However, the control unit 30 may acquire the direction of the relative wind by an input of an operator who pilots the vertical takeoff/landing aircraft 1. Subsequently, the control unit 30 of the vertical takeoff/landing aircraft 1 acquires the aircraft heading of the vertical takeoff/landing aircraft 1 from the navigation system 20 (step S12). The control unit 30 performs flight control of the vertical takeoff/landing aircraft 1 such that the direction of the relative wind and the aircraft heading face each other, based on the acquired direction of the relative wind and the acquired aircraft heading (Step S13). Specifically, in step S13, the direction (relative wind angle) of the relative wind coming from the front of the ship 5 in the ship heading is defined as a reference (0 deg). Then, in step S13, in a case where the relative wind is in a predetermined direction, the flight control of the vertical takeoff/landing aircraft 1 is performed such that the aircraft heading and a direction obtained by adding the direction of the relative wind to the ship heading coincide with each other. In step S13, the control unit 30 performs flight control of the vertical takeoff/landing aircraft 1. However, the operator who pilots the vertical takeoff/landing aircraft 1 may perform flight control of the vertical takeoff/landing aircraft 1. That is, in a case where the operator performs the flight control of the vertical takeoff/landing aircraft 1, in step S11, the operator may confirm the direction of the relative wind, and in step S13, the operator may perform the flight control such that the aircraft heading of the vertical takeoff/landing aircraft 1 coincides with the direction obtained by adding the direction of the relative wind to the ship heading.

After the execution of step S13, the control unit 30 determines whether or not the direction of the relative wind and the aircraft heading face each other, that is, whether or not the aircraft heading and the direction obtained by adding the direction of the relative wind to the ship heading coincide with each other (step S14). In step S14, when the control unit 30 determines that the direction of the relative wind and the aircraft heading face each other (Step S14: Yes), the control unit 30 enters a state in which the transition to the approach mode is possible. On the other hand, in step S14, when the control unit 30 determines that the direction of the relative wind and the aircraft heading do not face each other (step S14: No), the control unit 30 again proceeds to step S13 and executes the flight control until the direction of the relative wind and the aircraft heading face each other. After the transition to the approach mode, the control unit 30 executes a series of controls related to the landing operation shown in FIG. 4, and lands the vertical takeoff/landing aircraft 1 on the landing target point 2 (step S4).

Meanwhile, the control unit 30 executes the following control based on the wind speed of the relative wind acquired by the wind direction and speed meter 95 during the landing operation of the vertical takeoff/landing aircraft 1. When the wind speed of the relative wind is acquired in step S11 of FIG. 5, the control unit 30 determines whether or not the wind speed of the relative wind is equal to or higher than the first wind speed, and whether or not the wind speed of the relative wind is lower than the first wind speed and equal to or higher than the second wind speed. The first wind speed and the second wind speed are wind speeds in a case where the wind speed of the relative wind is high, and the first wind speed is higher than the second wind speed. For example, the first wind speed is set as a wind speed at which it is difficult to safely takeoff/land, and it is not desirable to perform takeoff/landing control. The second wind speed is a wind speed at which the takeoff/landing control can be performed, but the influence of the turbulence area formed by the structure of the ship 5 to be described later is large, and is set as a wind speed at which the turbulence avoidance control is desirably performed in combination during takeoff/landing. Specifically, the first wind speed is 35 kt, and the second wind speed is 20 kt. The first wind speed and the second wind speed are not particularly limited to the above numerical values. In addition, in a case where the acquired wind speed of the relative wind is lower than the second wind speed, the control unit 30 executes the steps after step S12.

In a case where the acquired wind speed of the relative wind is equal to or higher than the first wind speed, the control unit 30 outputs a movement instruction to the ship 5 and the vertical takeoff/landing aircraft 1 to move to a region where the wind speed is lower than the first wind speed without executing the takeoff/landing control of the vertical takeoff/landing aircraft 1. Specifically, the control unit 30 prompts the operator to move the ship 5 by displaying information indicating moving to the region where the wind speed is lower than the first wind speed on the operation display unit 90 of the ship 5. Similarly, the control unit 30 prompts the operator to move the vertical takeoff/landing aircraft 1 by notifying the operator of the vertical takeoff/landing aircraft 1 of the information indicating moving to the region where the wind speed is lower than the first wind speed. The control unit 30 executes flight control of the vertical takeoff/landing aircraft 1 and movement control of the ship 5 in a case where the vertical takeoff/landing aircraft 1 and the ship 5 are unmanned aircrafts. In addition, in the present embodiment, the control unit 30 outputs the movement instruction to the region where the wind speed is lower than the first wind speed. However, the operator (for example, the captain) of the ship 5 may confirm the wind speed and direction of the relative wind and move ship 5 to the region where the wind speed is lower than the first wind speed.

In a case where the acquired wind speed of the relative wind is lower than the first wind speed and is equal to or higher than the second wind speed, the control unit 30 executes turbulence avoidance control for avoiding the turbulence area generated at the landing target point 2 due to the relative wind. That is, the movement of the ship 5 is controlled to allow the vertical takeoff/landing aircraft 1 to approach the ship 5 while avoiding the turbulence area formed by the structure of the ship 5 to be described later, so that the position of the turbulence area to be formed is controlled. As the turbulence avoidance control, for example, the movement of the ship 5 is controlled such that the ship heading is +120 deg or less with respect to the direction of the relative wind. A range of +120 deg or less is a range in which the ship heading is −120 deg via 0 deg and +120 deg. In addition, the ship heading is set to be +120 deg or less in a case where the landing target point 2 is provided on the bow side of the ship 5. On the other hand, in a case where the landing target point 2 is provided on the stern side of the ship 5, the control unit 30 controls the movement of the ship 5 such that the ship heading is +30 deg or more with respect to the direction of the relative wind, as the turbulence avoidance control. A range of +30 deg or more is a range in which the ship heading is +30 deg via −30 deg and 180 deg. In a case where the acquired wind speed of the relative wind is lower than the first wind speed and is equal to or higher than the second wind speed, the control unit 30 may notify the operator of the ship 5 of the information for making the wind speed lower than the second wind speed, instead of the movement control (turbulence avoidance control) of the ship 5 described above, by displaying the information on the operation display unit 90 of the ship 5.

Here, a pattern of the takeoff/landing control during landing of the vertical takeoff/landing aircraft 1 will be described as an example with reference to FIG. 6. As described above, in step S13, in a case where the relative wind is in the predetermined direction, the flight control is performed on the vertical takeoff/landing aircraft 1 such that the aircraft heading and the direction obtained by adding the direction of the relative wind to the ship heading coincide with each other. From the left side of FIG. 6, the direction of the relative wind is 0 deg, 30 deg, 60 deg, 90 deg, 120 deg, 150 deg, and 180 deg. In addition, in FIG. 6, the vertical takeoff/landing aircraft 1 is in a state of being positioned at the return position P.

In a case where the direction of the relative wind is 0 deg, the control unit 30 of the vertical takeoff/landing aircraft 1 executes flight control such that the aircraft heading coincides with the ship heading. For this reason, in an approaching method of the vertical takeoff/landing aircraft 1 to the ship 5, the aircraft heading and the ship heading are in a state of coinciding with each other.

In a case where the direction of the relative wind is 30 deg, the control unit 30 of the vertical takeoff/landing aircraft 1 derives a direction in which 30 deg is added to the ship heading (ship heading +30 deg), and executes flight control such that the aircraft heading coincides with the ship heading +30 deg. For this reason, in the approaching method of the vertical takeoff/landing aircraft 1 to the ship 5, the aircraft heading is in a state of being inclined by 30 deg with respect to the ship heading.

Similarly, in a case where the direction of the relative wind is 60 deg or 90 deg, the control unit 30 of the vertical takeoff/landing aircraft 1 derives a direction in which 60 deg or 90 deg is added to the ship heading (ship heading +60 deg, ship heading +90 deg), and executes flight control such that the aircraft heading coincides with the ship heading +60 deg or the ship heading +90 deg. For this reason, in the approaching method of the vertical takeoff/landing aircraft 1 to the ship 5, the aircraft heading is in a state of being inclined by 60 deg or 90 deg with respect to the ship heading.

In addition, in a case where the direction of the relative wind is 120 deg, 150 deg, or 180 deg, the control unit 30 of the vertical takeoff/landing aircraft 1 derives the direction in which 120 deg, 150 deg, or 180 deg is added to the ship heading (the ship heading +120 deg, the ship heading +150 deg, the ship heading +180 deg). Here, in a case where a structure such as a bridge or a container is present on the stern side of the landing target point 2, the relative wind is a wind direction from the rear side. Therefore, the relative wind is disturbed by the structure, and thus a turbulence area E is formed on the bow side. Also in this case, the control unit 30 executes flight control such that the aircraft heading coincides with the ship heading +120 deg, the ship heading +150 deg, or the ship heading +180 deg. For this reason, in the approaching method of the vertical takeoff/landing aircraft 1 to the ship 5, the aircraft heading is in a state of being inclined by 120 deg, 150 deg, or 180 deg with respect to the ship heading. Therefore, the vertical takeoff/landing aircraft 1 can be landed on the landing target point 2 in the aircraft heading that is less likely to be affected by the turbulence area E.

Figure 7:
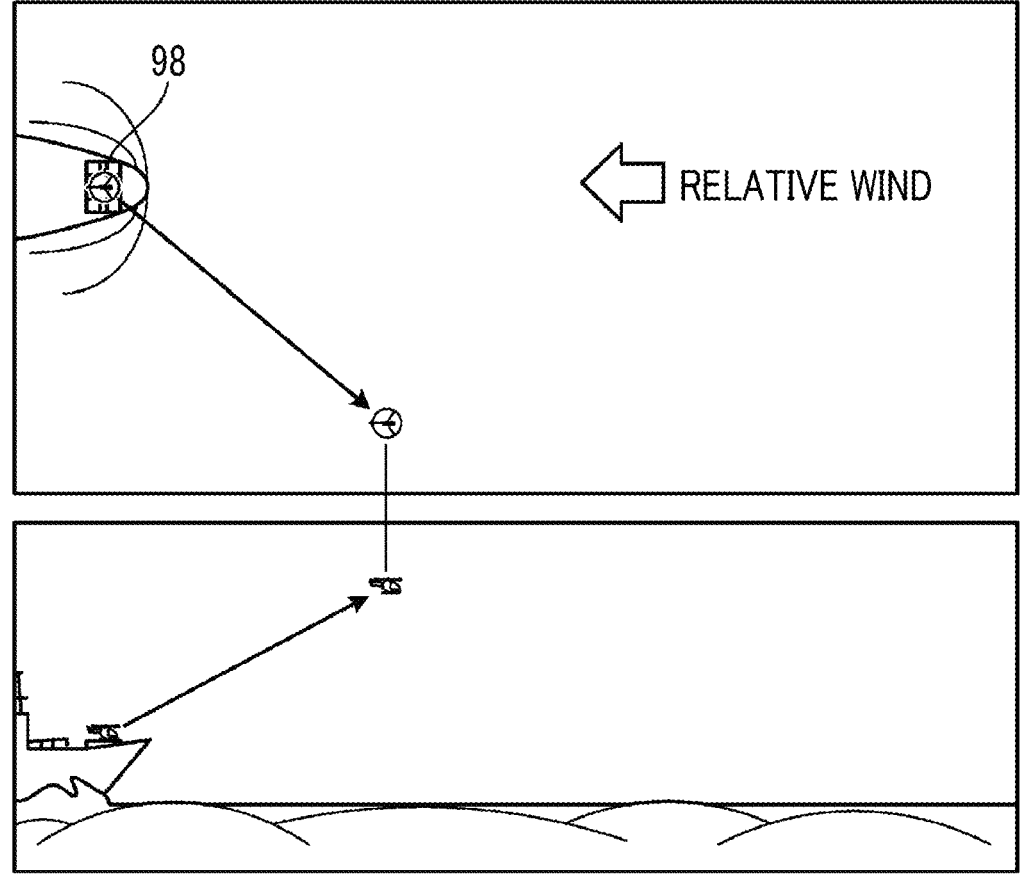
FIG. 7 is an explanatory view showing a takeoff operation of the vertical takeoff/landing aircraft according to the present embodiment.
Figure 8:
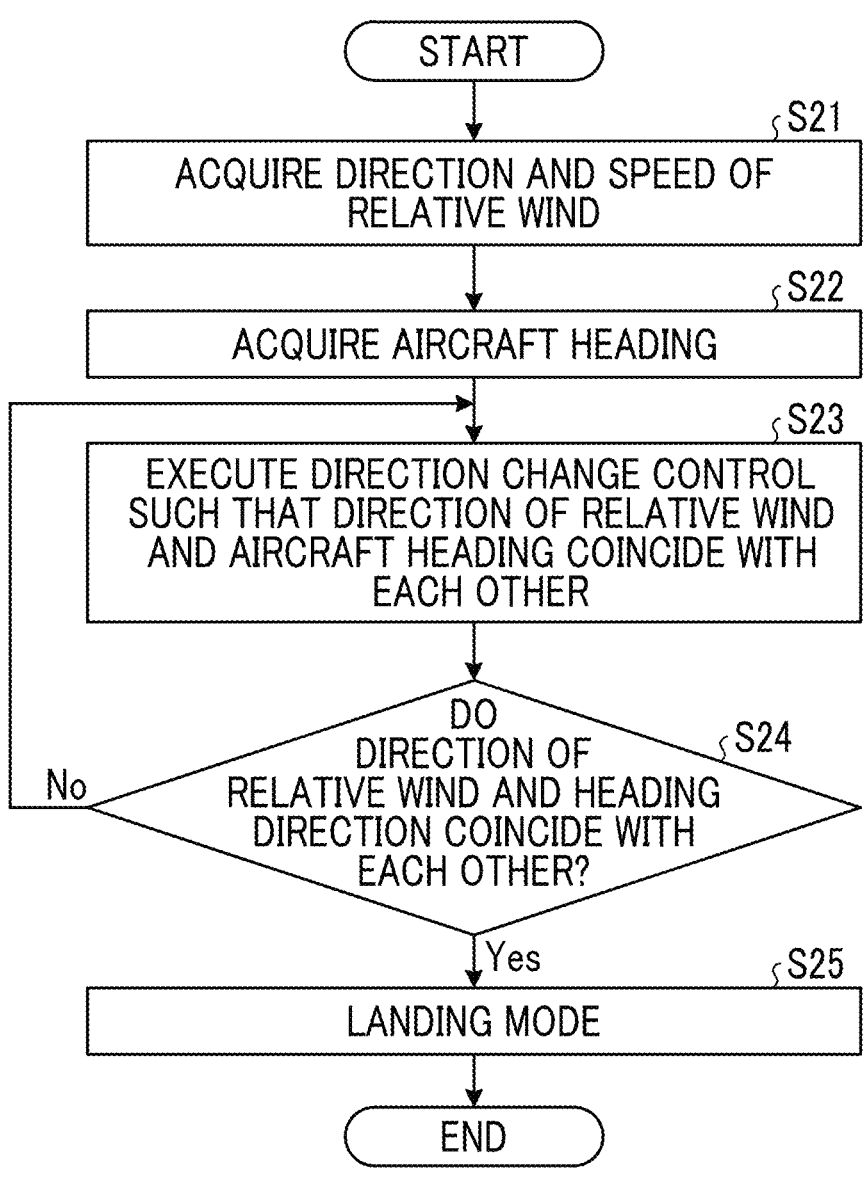
FIG. 8 is a flowchart showing an example of a processing procedure of the control method for takeoff/landing when the vertical takeoff/landing aircraft takes off according to the present embodiment.

Next, a procedure of takeoff of the vertical takeoff/landing aircraft 1 from the landing target point 2 by the control unit 30 will be described as a control method for takeoff/landing of the vertical takeoff/landing aircraft according to the present embodiment. FIG. 7 is an explanatory view showing a takeoff operation of the vertical takeoff/landing aircraft according to the present embodiment. FIG. 8 is a flowchart showing an example of a processing procedure of the control method for takeoff/landing when the vertical takeoff/landing aircraft takes off according to the present embodiment. FIG. 9 is an explanatory view showing an example of a pattern of the takeoff/landing control when the vertical takeoff/landing aircraft takes off according to the present embodiment.

A takeoff operation of the vertical takeoff/landing aircraft 1 will be described with reference to FIGS. 7 and 8. The vertical takeoff/landing aircraft 1 executes a takeoff mode in a series of takeoff operations of taking off (leaving) from the ship 5. Specifically, the vertical takeoff/landing aircraft 1 executes the takeoff/landing control shown in FIG. 8 before executing the takeoff mode. Here, as shown in FIG. 7, the ship 5 is provided with an aircraft heading changing unit 98 that changes the aircraft heading of the vertical takeoff/ landing aircraft 1 that has landed at the landing target point 2. The aircraft heading changing unit 98 is, for example, a rotating table, and is controlled by the ship 5 side.

In the automatic takeoff/landing system 100, in the ship 5, the wind direction and speed of the relative wind are measured and acquired by the wind direction and speed meter 95, and the control unit 30 of the vertical takeoff/landing aircraft 1 acquires the wind direction and speed of the relative wind acquired by the ship 5 (step S21). Subsequently, the control unit 30 of the vertical takeoff/landing aircraft 1 acquires the aircraft heading of the vertical takeoff/landing aircraft 1 from the navigation system 20 (step S22). Next, the ship 5 acquires the aircraft heading acquired by the vertical takeoff/landing aircraft 1 and controls the aircraft heading changing unit 98 such that the acquired direction of the relative wind and the aircraft heading face each other (Step S23). In step S23, the aircraft heading is changed by the aircraft heading changing unit 98 such that the aircraft heading and the direction obtained by adding the direction of the relative wind to the ship heading coincide with each other, as in step S13. Thereafter, the control unit 30 determines whether or not the direction of the relative wind and the aircraft heading face each other, that is, whether or not the aircraft heading and the direction obtained by adding the direction of the relative wind to the ship heading coincide with each other (step S24). In step S24, when it is determined that the direction of the relative wind and the aircraft heading face each other (step S24: Yes), the control unit 30 transitions to the takeoff mode (step S25). On the other hand, in Step S24, the control unit 30 determines that the direction of the relative wind and the aircraft heading do not face each other (step S24: No). Then, the process proceeds to step S23 again, and the aircraft heading of the vertical takeoff/landing aircraft 1 is changed by the aircraft heading changing unit 98 until the direction of the relative wind and the aircraft heading face each other. When the control unit 30 transitions to the takeoff mode of step S25, the control unit 30 causes the vertical takeoff/landing aircraft 1 to take off from the landing target point 2. It should be noted that the control based on the wind speed of the relative wind is also performed during the takeoff operation of the vertical takeoff/landing aircraft 1, and the control is the same as the control during the landing operation of the vertical takeoff/landing aircraft 1.

Here, a pattern of the takeoff/landing control of the vertical takeoff/landing aircraft 1 during takeoff will be described as an example with reference to FIG. 9. As described above, in step S23, in a case where the relative wind is in the predetermined direction, the aircraft heading is changed by the aircraft heading changing unit 98 such that the aircraft heading and the direction obtained by adding the direction of the relative wind to the ship heading coincide with each other. From the left side of FIG. 9, the direction of the relative wind is 0 deg, 30 deg, 60 deg, 90 deg, 120 deg, 150 deg, and 180 deg.

In a case where the direction of the relative wind is 0 deg, the ship 5 executes direction change control by the aircraft heading changing unit 98 such that the aircraft heading coincides with the ship heading. For this reason, the aircraft heading and the ship heading of the vertical takeoff/landing aircraft 1 are in a state of coinciding with each other.

In a case where the direction of the relative wind is 30 deg, the control unit 30 of the vertical takeoff/landing aircraft 1 derives a direction in which 30 deg is added to the ship heading (ship heading +30 deg). The ship 5 executes the direction change control by the aircraft heading changing unit 98 such that the aircraft heading coincides with the ship heading +30 deg. For this reason, the aircraft heading of the vertical takeoff/landing aircraft 1 is in a state of being inclined by 30 deg with respect to the ship heading.

Similarly, in a case where the direction of the relative wind is 60 deg or 90 deg, the control unit 30 of the vertical takeoff/landing aircraft 1 derives the direction in which 60 deg or 90 deg is added to the ship heading (ship heading +60 deg, ship heading +90 deg). The ship 5 executes the direction change control by the aircraft heading changing unit 98 such that the aircraft heading coincides with the ship heading +60 deg or the ship heading +90 deg. For this reason, the aircraft heading of the vertical takeoff/landing aircraft 1 is in a state of being inclined by 60 deg or 90 deg with respect to the ship heading.

In addition, in a case where the direction of the relative wind is 120 deg, 150 deg, or 180 deg, the control unit 30 of the vertical takeoff/landing aircraft 1 derives the direction in which 120 deg, 150 deg, or 180 deg is added to the ship heading (the ship heading +120 deg, the ship heading +150 deg, the ship heading +180 deg). Even during takeoff, the turbulence area E is formed on the bow side as in the case of landing. Also in this case, the ship 5 executes the direction change control by the aircraft heading changing unit 98 such that the aircraft heading coincides with the ship heading +120 deg, the ship heading +150 deg, or the ship heading +180 deg. For this reason, the aircraft heading of the vertical takeoff/landing aircraft 1 is in a state of being inclined by 120 deg, 150 deg, or 180 deg with respect to the ship heading. Therefore, the vertical takeoff/landing aircraft 1 can take off from the landing target point 2 in the aircraft heading which is less likely to be affected by the turbulence area E.

In the present embodiment, the vertical takeoff/landing aircraft 1 was controlled such that the aircraft heading and the direction of the relative wind coincide with each other. However, the error angle may include an aircraft heading error angle, which is an error angle between the aircraft heading and the direction of the relative wind. Here, an angle at which the aircraft heading and the direction of the relative wind face each other and coincide with each other is defined as reference angle 0 deg. The control unit 30 may cause the aircraft heading to face the direction of the relative wind in a range in which the aircraft heading error angle is +30 deg with respect to the reference angle 0 deg. That is, the aircraft heading of the vertical takeoff/landing aircraft 1 may not coincide with the direction of the relative wind, and may be +30 deg with respect to the direction of the relative wind. For example, as shown in FIG. 6, in a case where the direction of the relative wind is 90 deg and the reference angle is 0 deg, the aircraft heading of the vertical takeoff/landing aircraft 1 is 90 deg with respect to the ship heading of the ship 5. For this reason, for example, the aircraft heading error angle may be set to −30 deg, and the aircraft heading of the vertical takeoff/landing aircraft 1 may be set to 60 deg with respect to the ship heading of the ship 5.

In addition, embodiment, the in the present automatic takeoff/landing system 100 is mounted on the vertical takeoff/landing aircraft 1 and the ship 5, but may be mounted only on the vertical takeoff/landing aircraft 1. In this case, it is necessary to acquire the wind direction and speed of the relative wind in the ship 5, and the wind direction and speed of the relative wind in the ship 5 can be derived from the speed of the ship 5 and the true wind in the ground coordinate system. Therefore, in a case where the automatic takeoff/landing system 100 is mounted only on the vertical takeoff/landing aircraft 1, the above-described configuration can be realized by acquiring the speed of the ship 5 and the true wind direction and speed in the ground coordinate system.

In addition, in the present embodiment, the aircraft heading changing unit 98 is controlled by the ship 5, but may be controlled by the control unit 30 of the vertical takeoff/landing aircraft 1.

As described above, the automatic takeoff/landing system for a vertical takeoff/landing aircraft, the vertical takeoff/landing aircraft, and the control method for takeoff/landing of a vertical takeoff/landing aircraft according to the present embodiment are grasped as follows, for example.

According to a first aspect, an automatic takeoff/landing system 100 for a vertical takeoff/landing aircraft 1 includes: a relative wind information acquisition unit (wind direction and speed meter 95) that acquires a direction of a relative wind surrounding a moving object (ship 5); and a control unit 30 that executes takeoff/landing control for takeoff/landing of the vertical takeoff/landing aircraft 1 at a landing target point 2 provided on the moving object, in which the control unit 30, during takeoff/landing of the vertical takeoff/landing aircraft 1, executes the takeoff/landing control based on the direction of the relative wind acquired by the relative wind information acquisition unit, in a state in which an aircraft heading of the vertical takeoff/landing aircraft 1 faces the direction of the relative wind.

According to this configuration, the vertical takeoff/landing aircraft 1 can takeoff/land in a state in which the aircraft heading of the vertical takeoff/landing aircraft 1 faces the direction of the relative wind. Therefore, the vertical takeoff/landing aircraft 1 can be brought into a state in which it is less likely to be affected by the relative wind. Therefore, the vertical takeoff/landing aircraft 1 can takeoff/land regardless of the direction of the relative wind. Therefore, it is possible to suitably perform takeoff/landing of the vertical takeoff/landing aircraft 1 to the landing target point 2 by relaxing the takeoff/landing restriction due to the relative wind.

According to a second aspect, the relative wind information acquisition unit may acquire a wind speed of the relative wind, and the control unit 30 may execute control based on the wind speed of the relative wind acquired by the relative wind information acquisition unit during takeoff/landing of the vertical takeoff/landing aircraft 1, and may execute, in a case where the wind speed of the relative wind is equal to or higher than a second wind speed, turbulence avoidance control for avoiding a turbulence area generated for the landing target point 2 due to the relative wind.

According to this configuration, in a case where the wind speed of the relative wind, which is a strong wind, is equal to or higher than the second wind speed, the turbulence avoidance control is executed to avoid the turbulence area generated at the landing target point 2. Therefore, the aircraft can be less likely to be affected by the relative wind.

According to a third aspect, in a case where a wind speed of the relative wind is equal to or higher than a first wind speed that is higher than a second wind speed, the control unit 30 may instruct the moving object and the vertical takeoff/landing aircraft 1 to move to a region where the wind speed becomes lower than the first wind speed, without executing the takeoff/landing control of the vertical takeoff/landing aircraft 1.

According to this configuration, in a case where the wind speed of the relative wind, which is a strong wind, is equal to or higher than the first wind speed, the movement of the moving object and the vertical takeoff/landing aircraft 1 can be promoted to a region where the wind speed of the relative wind is weak, and a safe takeoff/landing of the vertical takeoff/landing aircraft 1 at the landing target point 2 can be performed.

According to a fourth aspect, in a case where the wind speed of the relative wind is equal to or higher than the second wind speed, the control unit 30 may notify an operator who operates the moving object of information for making the wind speed of the relative wind lower than the second wind speed.

According to this configuration, in a case where the wind speed of the relative wind, which is a strong wind, is equal to or higher than the second wind speed, the movement for weakening the wind speed of the relative wind can be performed by the moving object, and the safe takeoff/landing of the vertical takeoff/landing aircraft 1 at the landing target point 2 can be performed.

According to a fifth aspect, in a case where the wind speed of the relative wind is equal to or higher than the first wind speed that is higher than the second wind speed, the control unit 30 may notify an operator who operates the moving object of information for making the wind speed of the relative wind lower than the first wind speed.

According to this configuration, in a case where the wind speed of the relative wind, which is a strong wind, is equal to or higher than the first wind speed, the movement for weakening the wind speed of the relative wind can be performed by the moving object, and the safe takeoff/landing of the vertical takeoff/landing aircraft 1 at the landing target point 2 can be performed.

According to a sixth aspect, when an error angle formed by the aircraft heading and the direction of the relative wind is defined as an aircraft heading error angle, and an angle at which the aircraft heading and the direction of the relative wind face each other and coincide with each other is defined as a reference angle 0 deg, the control unit 30 may cause the aircraft heading to face the direction of the relative wind in a range where the aircraft heading error angle is +30 deg with respect to the reference angle 0 deg.

According to this configuration, even in a case where the direction of the relative wind and the aircraft heading of the vertical takeoff/landing aircraft 1 face each other, the direction of the relative wind and the aircraft heading of the vertical takeoff/landing aircraft 1 are not necessary to coincide (set to 0 deg) with each other. Therefore, it is possible to prioritize safe takeoff/landing of the vertical takeoff/landing aircraft 1 at the landing target point 2.

According to a seventh aspect, the moving object may be a ship 5, and the landing target point 2 may be provided on a bow side of the ship 5.

According to this configuration, the landing target point 2 is provided on the bow side, so that it is possible to make it less likely to be affected by the turbulence generated by the structure on the stern side.

According to an eighth aspect, the automatic takeoff/landing system for a vertical takeoff/landing aircraft further includes an aircraft heading changing unit 98 that changes the aircraft heading of the vertical takeoff/landing aircraft 1 that has landed on the landing target point 2, in which the control unit 30 causes the vertical takeoff/landing aircraft 1 to take off from the landing target point 2 when the aircraft heading of the vertical takeoff/landing aircraft 1 changed by the aircraft heading changing unit 98 and the direction of the relative wind acquired by the relative wind information acquisition unit face each other during takeoff of the vertical takeoff/landing aircraft 1.

According to this configuration, the aircraft heading of the vertical takeoff/landing aircraft 1 at the landing target point 2 is changed by the aircraft heading changing unit 98, so that the vertical takeoff/landing aircraft 1 can take off in a state of being faced to the direction of the relative wind.

According to a ninth aspect, the vertical takeoff/landing aircraft 1 may include the automatic takeoff/landing system 100 for a vertical takeoff/landing aircraft 1.

According to this configuration, a configuration in which the automatic takeoff/landing system 100 is mounted only on the vertical takeoff/landing aircraft 1 can be realized when it is possible to acquire the speed of the ship 5 and the true wind direction and speed in the ground coordinate system.

According to a tenth aspect, a control method for takeoff/landing of a vertical takeoff/landing aircraft, the control method including: causing an automatic takeoff/landing system 100 of the vertical takeoff/landing aircraft 1, which executes takeoff/landing control for takeoff/landing of the vertical takeoff/landing aircraft 1 at a landing target point 2 provided on a moving object (ship 5), to execute steps S11 and S21 of acquiring a direction of a relative wind in the moving object; steps S13 and S23 of causing an aircraft heading of the vertical takeoff/landing aircraft 1 to face the direction of the relative wind based on the acquired direction of the relative wind; and steps S4 and S25 of causing the vertical takeoff/landing aircraft 1 to takeoff/land at the landing target point 2.

According to this configuration, the vertical takeoff/landing aircraft 1 can takeoff/land in a state in which the aircraft heading of the vertical takeoff/landing aircraft 1 faces the direction of the relative wind. Therefore, the vertical takeoff/landing aircraft 1 can be brought into a state in which it is less likely to be affected by the relative wind. Therefore, the vertical takeoff/landing aircraft 1 can takeoff/land regardless of the direction of the relative wind. Therefore, it is possible to suitably perform takeoff/landing of the vertical takeoff/landing aircraft 1 to the landing target point 2 by relaxing the takeoff/landing restriction due to the relative wind.

REFERENCE SIGNS LIST

1: vertical takeoff/landing aircraft
2: landing target point
5: ship
7: marker
10: camera
20, 70: navigation system
30: control unit
32: image processing unit
34: guidance calculation unit
36: flight control unit
40, 80: data transmission device
95: wind direction and speed meter
98: aircraft heading changing unit
100: automatic takeoff/landing system

The invention claimed is:

1. An automatic takeoff/landing system for a vertical takeoff/landing aircraft comprising:

a non-transitory memory configured to store a program;

a processor configured to execute the program stored on the memory to cause the automatic takeoff/landing system to:

acquire a direction of a relative wind surrounding a moving object; and acquire a ship heading of the moving object, and execute takeoff/landing control for takeoff/landing of the vertical takeoff/landing aircraft at a landing target point provided on the moving object, wherein, during takeoff/landing of the vertical takeoff/landing aircraft, the processor is further configured to execute the program stored on the memory to cause the automatic takeoff/landing system to execute the takeoff/landing control based on the direction of the relative wind acquired and the ship heading of the moving object, controlling the flight such that an aircraft heading of the vertical takeoff/landing aircraft becomes a direction by adding the ship heading of the moving object to the direction of the relative wind, in a state in which the aircraft heading of the vertical takeoff/landing aircraft faces the direction of the relative wind.

2. The automatic takeoff/landing system for a vertical takeoff/landing aircraft according to claim 1, wherein the processor is further configured to execute the program stored on the memory to cause the automatic takeoff/landing system to acquire a wind speed of the relative wind, and execute control based on the wind speed of the relative wind acquired during takeoff/landing of the vertical takeoff/landing aircraft, and execute, in a case where the wind speed of the relative wind is equal to or higher than a second wind speed, turbulence avoidance control for avoiding a turbulence area generated for the landing target point due to the relative wind.

3. The automatic takeoff/landing system for a vertical takeoff/landing aircraft according to claim 1, wherein in a case where a wind speed of the relative wind is equal to or higher than a first wind speed, the processor is further configured to execute the program stored on the memory to cause the automatic takeoff/landing system to instruct the moving object and the vertical takeoff/landing aircraft to move to a region where the wind speed becomes lower than the first wind speed, without executing the takeoff/landing control of the vertical takeoff/landing aircraft.

4. The automatic takeoff/landing system for a vertical takeoff/landing aircraft according to claim 2, wherein in a case where the wind speed of the relative wind is equal to or higher than the second wind speed, the processor is further configured to execute the program stored on the memory to cause the automatic takeoff/landing system to notify an operator who operates the moving object of information for making the wind speed of the relative wind lower than the second wind speed.

5. The automatic takeoff/landing system for a vertical takeoff/landing aircraft according to claim 3, wherein in a case where the wind speed of the relative wind is equal to or higher than the first wind speed that is higher than the second wind speed, the processor is further configured to execute the program stored on the memory to cause the automatic takeoff/landing system to notify an operator who operates the moving object of information for making the wind speed of the relative wind lower than the first wind speed.

6. The automatic takeoff/landing system for a vertical takeoff/landing aircraft according to claim 1, wherein when an error angle formed by the aircraft heading and the direction of the relative wind is defined as an aircraft heading error angle, and an angle at which the aircraft heading and the direction of the relative wind face each other and coincide with each other is defined as a reference angle 0 deg, the processor is further configured to execute the program stored on the memory to cause the automatic takeoff/ landing system to cause the aircraft heading to face the direction of the relative wind within a range where the aircraft heading error angle is ±30 deg with respect to the reference angle 0 deg.

7. The automatic takeoff/landing system for a vertical takeoff/landing aircraft according to claim 1, wherein the moving object is a ship, and the landing target point is provided on a bow side of the ship.

8. The automatic takeoff/landing system for a vertical takeoff/landing aircraft according to claim 1, wherein the processor is further configured to execute the program stored on the memory to cause the automatic takeoff/landing system to change the aircraft heading of the vertical takeoff/landing aircraft that has landed on the landing target point, wherein the processor is further configured to execute the program stored on the memory to cause the automatic takeoff/landing system to cause the vertical takeoff/landing aircraft to take off from the landing target point when the aircraft heading of the vertical takeoff/landing aircraft changed and the direction of the relative wind acquired face each other during takeoff of the vertical takeoff/landing aircraft.

9. A vertical takeoff/landing aircraft comprising:

the automatic takeoff/landing system for a vertical takeoff/landing aircraft according to claim 1.

10. A control method for takeoff/landing of a vertical takeoff/landing aircraft, the control method comprising:

causing an automatic takeoff/landing system of the vertical takeoff/landing aircraft, which executes takeoff/landing control for takeoff/landing of the vertical takeoff/landing aircraft at a landing target point provided on a moving object, to execute acquiring a direction of a relative wind in the moving object, acquiring a ship heading of the moving object, causing an aircraft heading of the vertical takeoff/landing aircraft to face the direction of the relative wind based on the acquired direction of the relative wind and the ship heading of the moving object, controlling the flight such that an aircraft heading of the vertical takeoff/landing aircraft becomes a direction by adding the ship heading of the moving object to the direction of the relative wind, in a state in which the aircraft heading of the vertical takeoff/landing aircraft faces the direction of the relative wind, and causing the vertical takeoff/landing aircraft to takeoff/land at the landing target point.

11. The automatic takeoff/landing system for a vertical takeoff/landing aircraft according to claim 2, wherein in a case where a wind speed of the relative wind is equal to or higher than a first wind speed that is higher than the second wind speed, the processor is further configured to execute the program stored on the memory to cause the automatic takeoff/landing system to instruct the moving object and the vertical takeoff/landing aircraft to move to a region where the wind speed becomes lower than the first wind speed, without executing the takeoff/landing control of the vertical takeoff/landing aircraft.

* * * * *